US009271477B2

(12) United States Patent
Angell et al.

(10) Patent No.: US 9,271,477 B2
(45) Date of Patent: Mar. 1, 2016

(54) DEVICE FOR FISH FARM CAGE

(71) Applicant: CALANUS AS, Tromsø (NO)

(72) Inventors: Snorre Angell, Sortland (NO); Remi Mathisen, Sortland (NO); Bjarne Johansen, Sortland (NO); Trond Larsen, Sortland (NO); Kurt Steinar Tande, Kvaløysletta (NO)

(73) Assignee: Calanus AS, Tromso (NO)

( * ) Notice: Subject to any disclaimer, the term of this patent is extended or adjusted under 35 U.S.C. 154(b) by 0 days.

(21) Appl. No.: 14/377,594

(22) PCT Filed: Feb. 12, 2013

(86) PCT No.: PCT/EP2013/052789
§ 371 (c)(1),
(2) Date: Aug. 8, 2014

(87) PCT Pub. No.: WO2013/117773
PCT Pub. Date: Aug. 15, 2013

(65) Prior Publication Data
US 2015/0000606 A1 Jan. 1, 2015

(30) Foreign Application Priority Data
Feb. 9, 2012 (NO) .................................. 20120133

(51) Int. Cl.
*A01K 61/00* (2006.01)
(52) U.S. Cl.
CPC .................................. *A01K 61/007* (2013.01)

(58) Field of Classification Search
CPC ...... A01K 61/007; A01K 74/00; A01K 77/00
USPC ......... 119/223, 200, 215, 219, 221, 226, 234, 119/236
See application file for complete search history.

(56) References Cited

U.S. PATENT DOCUMENTS

| 4,982,697 | A |   | 1/1991  | Neff |
| 4,986,021 | A | * | 1/1991  | Thomas ........................... 43/14 |
| 5,193,481 | A | * | 3/1993  | Loverich et al. .............. 119/223 |
| 5,269,254 | A | * | 12/1993 | Gagliano ............. A01K 61/002 119/236 |

(Continued)

FOREIGN PATENT DOCUMENTS

| NO | 312056 B1 | 12/1999 |
| NO | 331189 B1 | 10/2011 |

(Continued)

OTHER PUBLICATIONS

International Search Report and Written Opinion issued Dec. 2, 2013, by European Patent Office in corresponding International Application No. PCT/EP2013/052789.

(Continued)

*Primary Examiner* — Yvonne Abbott-Lewis
(74) *Attorney, Agent, or Firm* — Finnegan, Henderson, Farabow, Garrett and Dunner L.L.P.

(57) ABSTRACT

The present invention relates to a device for isolating farm cages for fish against undesirable organisms, which device is arranged enclosing the farm cage, where the device comprises a fine-meshed fluid-permeable net which is open upwardly and downwardly when arranged round the farm cage, where the fluid-permeable net will extend a distance down in the farm cage's depth direction, in order thereby to form a skirt round the farm cage.

8 Claims, 3 Drawing Sheets

(56) References Cited

U.S. PATENT DOCUMENTS

Figure 1:
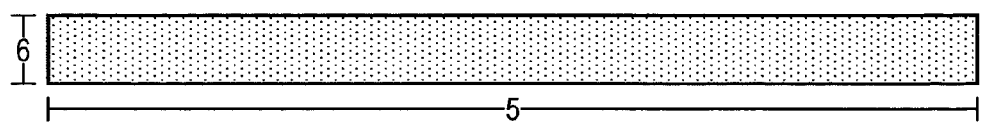

| | | | | |
|---|---|---|---|---|
| 5,299,530 | A * | 4/1994 | Mukadam et al. | 119/223 |
| RE34,971 | E * | 6/1995 | Loverich | A01K 73/12 |
| | | | | 119/223 |
| 5,477,813 | A * | 12/1995 | Lien | 119/223 |
| 5,617,813 | A * | 4/1997 | Loverich et al. | 119/223 |
| 5,713,303 | A * | 2/1998 | Willinsky et al. | 119/218 |
| 6,062,170 | A | 5/2000 | Finch et al. | |
| 6,065,239 | A * | 5/2000 | Thomas et al. | 43/4.5 |
| 6,117,457 | A * | 9/2000 | Devos et al. | 424/616 |
| 6,267,079 | B1 * | 7/2001 | Eby | A01K 63/00 |
| | | | | 119/226 |
| 6,481,378 | B1 * | 11/2002 | Zemach | A01K 61/007 |
| | | | | 119/223 |
| 7,415,136 | B2 * | 8/2008 | Gallagher | G02B 27/52 |
| | | | | 119/234 |
| 8,082,868 | B1 * | 12/2011 | Johnson | 114/230.1 |
| 8,770,149 | B2 * | 7/2014 | Mizrachi | 119/223 |

FOREIGN PATENT DOCUMENTS

| | | | |
|---|---|---|---|
| NO | 333479 | B1 | 6/2013 |
| WO | WO 99/63824 | A2 | 12/1999 |
| WO | WO 03/063583 | A2 | 8/2003 |
| WO | WO 2010/050825 | A1 | 5/2010 |
| WO | WO 2013/117773 | A2 | 8/2013 |
| WO | WO 2013/117773 | A3 | 8/2013 |
| WO | WO 2013/117773 | A8 | 8/2013 |

OTHER PUBLICATIONS

Norwegian Search Report issued Aug. 16, 2012, in Norwegian Application No. 20120133.

Notification of Decision on Request to Restore Right of Priority issued Dec. 16, 2013 by European Patent Office in corresponding International Application No. PCT/EP2013/052789.

Donald M. Anderson et al., "Monitoring and Management Strategies for Harmful Algal Blooms in Coastal Waters," 2001, pp. 201-203, Asia Pacific Economic Program, Paris.

"New Brunswick, Canada Sea Lice Integrated Pest Management," Feb. 2010, from "Multi-National Sea Lice R & D Meeting," Bergen, Norway.

Andreas Myskja Lien et al., "Skjørt for skjerming mot lus i laksemerd," May 11, 2011, Norway.

Ø. Prestvik et al., "Bruk av Salsnes filterteknologi for fjerning av lakselus fra pumpevann ved et lakseslakteri," Feb. 2010, Norway.

Andreas Myskja Lien et al., "Deformasjon av not og Permaskjørt og krefter pa fortøyning," Mar. 2012, Norway.

Andreas Myskja Lien, "Oppstartsmøte I prosjekt Permaskjørt," Jan. 10, 2012, Norway.

Botngaard AS, "Lakselus-Seminar Molde," Nov. 29, 2011, Norway.

Hos Sinkaberghansen, "Erfaringer med permaskjørt," Jan. 10, 2012, Norway.

Peter Andreas Heuch & Thomas A. Schram, "Crustacea (krepsdyr)," in "Fiskehelse og fiskesykdommer," 1999, pp. 219-226, Universitetsforlaget AS, Norway.

Randi Nygaard Grøntvedt, "Lakselus og kunnskap: Hvor står vi, hva skjer og hva vet vi ikke?," Jun. 2010, Norway.

* cited by examiner

DEVICE FOR FISH FARM CAGE

CROSS REFERENCE TO RELATED APPLICATION

This application is a 35 U.S.C. §371 national phase application based on PCT/EP2013/052789, filed Feb. 12, 2013, the content of which is incorporated herein by reference in its entirety and the full benefit of priority are hereby claimed. This application is also related to Norwegian Patent Application No. 20120133, filed Feb. 9, 2012, the content of which is incorporated herein by reference in its entirety.

The present invention relates to a device which is employed for enclosing a fish farm cage according to the introductory part of the independent claim. This application is a national stage entry of PCT Application No. PCT/EP2013/052789 filed on Feb. 12, 2013, which claims priority to Norwegian Patent Application No. 20120133 filed Feb. 9, 2012, both of which are incorporated by reference in their entireties and with full rights of priority claimed.

The present invention relates to a device for isolating a farm cage for fish against undesirable organisms, where the device comprises an open net which is attached in an enveloping manner to the farm cage. More particularly, the present invention relates to a fine-meshed fluid-permeable net for protecting farm cages for fish against undesirable organisms, such as for example sea lice and meroplankton, while at the same time the net ensures good living conditions for the fish, particularly with regard to oxygen supply, and prevents harmful fouling on the net line. The fluid-permeable net is easy to install, remove, replace and maintain. By means of its design the net will permit water to penetrate the net, while stopping the undesirable organisms outside the cage. The net is not dependent on other devices (such as circulation pumps or light) in order to function, but may be used in connection therewith.

Fouling of cages, invasion of jellyfish in fish farm localities and direct infestation of ectoparasites on farmed fish result in substantial economic losses for the fish farming industry in Norway, Scotland, Canada and Chile. For the salmon industry in Norway alone the annual maintenance costs for controlling fouling in the fish farms are considerable, and the financial losses directly due to sea lice globally are estimated to be of the order of 2.4 billion Norwegian crowns per year (Wadsworth, S. and B. Lygren, 2004. *Norsk Fiskeoppdrett* no. 2, 50-53). In 1995 the costs due to salmon lice in Canada were estimated at 20 million CAD, and at £30 million in Scotland in 1998 (Pike, A. W. and S. L. Wadsworth 1999, *Advances in Parasitology,* 44, 233-337; Rae, G. 2002, *Pest. Manag. Sci,* 58, 515-520). The main cause of these great losses is an almost epidemic development and infestation of salmon lice (*Lepeophtheirus* spp., *Caligus* spp.) both on farmed salmon (*Salmo salar*) and trout (*Onchorynchus mykiss*). In addition to this, an anticipated expansion in fish farming will inevitably lead to an increase in the population of salmon lice in the marine environment, and infection by salmon lice is regarded as an increasing threat to the wild fish stocks. There is also reason for concern with regard to environmental consequences with the use of pesticides for cleaning nets and delousing of fish, with the resulting negative reputation for the industry. Treatment also involves the risk of escape, death and injuries to the fish.

In Norwegian waters fouling of cages is a seasonal problem associated with the flowering of plant plankton, macroalgae and meroplankton (larvae of mussels, hydroids, etc.), with the greatest infestation in connection with the reproduction period of these species. In the same way the incidence of jellyfish is slightly delayed in time relative to the productive period and reports of jellyfish invasions in fish farms in fjord localities are therefore most frequently received in the autumn. However, the incidence of and infection by salmon lice has developed into an all-year-round phenomenon, since the parasite population contains adult females which produce offspring continuously throughout the year, thereby accentuating the seriousness of the epidemic (Heuch, P. A., P. A. Bjørn, B. Finstad, J. C. Hoist, L. Asplin and F. Nilsen 2005, *Aquaculture* 246, 79-92).

Adult salmon lice carry egg strings with developing embryos, which after hatching pass through a pelagic phase with two nauplius stages with a life of approximately four days, and a copepodit stage. This infectious copepodit stage is followed by four sessile and two pre-adult stages before the species reaches the adult reproductive stage (Johnson, S. C. and L. J. Albright 1991. *J. Mar. Biol. Assoc. U.K.* 71, 425-436). At sea temperatures of 8° C. salmon lice have a pelagic phase of approximately one month, where only the copepodit stage is capable of infecting the host for a period of 2-4 weeks under Norwegian temperature conditions (Heuch, P. A., P. A. Bjørn, B. Finstad, J. C. Hoist, L. Asplin and F. Nilsen 2005, *Aquaculture* 246, 79-92). The pelagic stages avoid water with a lower salt content than 20 per mil, and the infectious copepodit stage has a behaviour which ensures a position close to the surface of the sea through positive phototaxis (Bron, J., C. Sommerville and G. Rae, In: Boxhall, D. A. and D. Defaye (eds) *Sea lice*. Ellis Horwood London, pp. 125-140; Heuch, P. A. 1995. *J. Mar. Biol. Assoc. U.K.* 75, 927-939; Flamarique, I. N., H. I. Brownian, M Belanger and K. Boxspen. 2000. *J. Exp. Biol.* 203, 1649-1657). The epidemic development of salmon lice is therefore coupled to an efficient dispersal mechanism where the infectious stage seeks the surface which has the greatest transport potential via advection.

Norwegian fjord and coastal waters have unique habitats with substantial marine bioproduction of wild-living resources (Tande K. S. 2000, In Steele, J. (ed.). *Encyclopedia of Oceans Sciences*, Academic Press, pp. 902-909). Favourable sea temperatures in combination with protecting skerries make these waters particularly suitable for fish farming. In addition to favourable environmental conditions, tidal water, wind and bottom topography ensure that these areas are dominated by advective processes which provide continuous replacement of water. On account of fresh water run-off from land and the continuous drift from the northerly Atlantic current, there is a net northerly transport of water in the Norwegian coastal current (Sætre, R. 2007. *The Norwegian Coastal Current*, Tapir Academic Press, 159 pp). The velocity of this current varies with the bottom conditions, but current velocities of 50 cm per second are not unusual. Under such conditions particles will be able to be transported from a few to several hundred kilometers in the course of a period of four weeks. The northerly net transport, however, is modified and delayed, particularly by the tides, dominating wind directions and the geomorphology of the fjord systems (Tande. K. S. 2000. In Steele, J. (ed.). *Encyclopedia of Oceans Sciences*, Academic Press, pp 902-909). These driving forces cause the advection to be greatest in the uppermost 0-10 meters of the water column along the whole Norwegian coastal zone. The transport is controlled by the coastal current curving outwards over shallow bank areas and the Atlantic current curving inwards over the shelf in deep troughs. This mixture is transported on from coast to fjord through the fresh-water and water level-driven estuarine circulation in the uppermost layers (Rinde, E., A. Bjørge, A. Eggereide and G. Tufteland (eds) 2001. *Kystøkalogi—den ressursrike norskekysten*, Universitetsforlaget, 214 pp). Northerly transport of salmon lice with the coastal current and the Atlantic current, together with water replacement between the coastal current and fjords is important for understanding the possibilities for remedying the current salmon louse epidemic.

The growth of the salmon industry is presumed to have contributed to altering the epidemiology of salmon lice as the number of hosts has increased greatly over time in Norwegian waters, Monitoring programs in the Norwegian coastal zone show that all wild salmonids are subject to substantial infestation and infection by salmon lice (Heuch, P. A., P. A. Bjørn, B. Finstad, J. C. Holst, L. Asplin and F. Nilsen 2005, *Aquaculture* 246, 79-92). In 2008 a study was carried out on the pressure of infection from salmon lice on wild-living salmonids in ten Norwegian salmon fjords from the South Coast to Finnmark, in the form of prevalence (number of infected fish as a percentage of the total number of fish) and the intensity of infection (number of lice per infected fish). For the majority of the fjords the prevalence was found to be >50%, and the intensity of infection in the range 2-50 (Bjørn, P. A., B. Finstad, R. Nilsen, I. Uglem, L. Asplin, Ø. Skaala, K. K. Boxaspen and T. Øverland 2009. *NINA report* 447, 52 s). For farmed salmon the louse infestation is significant in those parts of the Norwegian coastal zone which are utilised, and orders to monitor the intensity and measures in the facility are given when threshold values are exceeded.

On account of the major challenges involved in connection with salmon lice on the fish, the authorities in collaboration with the salmon industry have initiated a number of measures to combat the problems. Today medication, medicated feed, mechanical washing and wrasse fish are employed as treatment when the salmon louse problem has already arisen. Extensive medicinal treatment is problematic due to the development of resistance in salmon lice to the treatment agents. This type of treatment is also subject to negative attention with respect to environmental effects, in addition to which it is extremely expensive. Mechanical washing of fish sinkers to stress and the risk of damage to the fish, and at present is most suitable for use on large fish in connection with sorting. The use of wrasse is a delousing method without negative environmental effects, but the supply is limited for the present, as the use of wrasse requires clean walls in the cages and from the biological point of view it has been found to be difficult to use wrasse in northern Norway.

Tests have been carried out with sealed tarpaulins round salmon cages. These had positive results with regard to salmon lice, but encounter major challenges with regard to mooring and currents under and round the tarpaulin. They are also extremely heavy and difficult to handle. There are also great challenges in obtaining sufficient oxygen in the upper water layers of a cage when the topmost meters are sealed.

Norwegian patent NO 312056 B1 discloses a method to control parasitic infestations including infestations with sea lice and isopod species in farmed fish in which antiparasitically active substances are formulated as an injectable composition, optionally in a fish vaccine. A composition for therapeutic and prophylactic control of parasites in farmed and wild fish comprising hexaflumuron or other chitin synthesis inhibitors as the active substance is also described. Hexaflumuron can be administered as a bath treatment, orally through the feed, or as separate injections. The composition has a therapeutic effect against parasites that are already present on the fish and confers protection against new parasitic infestation for an extended period of time after treatment.

Norwegian patent NO 331189 B1 discloses a device for the treatment, e.g. delousing, of fish in net cages comprises a tarpaulin having a dimension which is enclosing the net cage in a completely covering manner beneath the sea level. To either raise or lower the tarpaulin up into a position surrounding the net cage beneath the sea surface or down to a level beneath its lower portion, respectively, the tarpaulin is provided with at or close to the outer circumference thereof more buoyancy elements each individually adapted to be filled with or drained for a fluid such as air or liquid as to raise or lower the tarpaulin up to the sea surface or down beneath a lower portion of the net cage, respectively.

U.S. Pat. No. 6,062,170 discloses a method and apparatus for reducing or eliminating the contamination by algae or phytoplankton in a fish farm. A series of tarpaulins are suspended from buoyant members who support the netting of the farm. The tarpaulins are connected at their lowermost ends to a movable series of horizontal booms that may take on air for positive buoyancy or which may displace the air with water for negative buoyancy. As the booms are raised or lowered, the tarpaulins are similarly raised or lowered to allow or prevent algae from entering the farm. A water pipe is maintained in position within each cage. Air is injected into the water pipe from a compressor. The injected air initiates water flow upwardly within the water pipe. The outlet of the water pipe is maintained below the surface of the water within which the water pipe is positioned and dispenses the air and water into the water below the water surface.

The common features of the known solutions are that they fail to supply a through-flow of water in the farm cage, problems may also arise in connection with waste in the farm cage, and/or they involve the use of pesticides in the treatment of fish.

The object of the present invention is to provide a device in the form of a fluid-permeable net which is used to enclose a fish farm cage with a view to protecting fish in the farm cage from undesirable organisms, where at the same time the fluid-permeable net ensures good living conditions for the fish.

A further object according to the present invention is to provide a fluid-permeable net which is easy to install, remove, replace and maintain.

These objects are achieved according to the present invention with a fluid-permeable net as defined in the characterising part of the independent claim. Further embodiments of the invention are defined in the dependent claims.

According to the present invention a device is developed for isolating a farm cage for fish, where the device comprises a fine-meshed fluid-permeable net for the protection of farmed fish and nets against exposure to and infestation by undesirable organisms such as algae, sea lice, jellyfish and meroplankton.

The present invention relates to a device for isolating a farm cage for fish against undesirable organisms, where the device is arranged enveloping the farm cage, where the device comprises a fluid-permeable net which is open upwardly and downwardly when the fluid-permeable net is arranged enveloping the farm cage, which fluid-permeable net will extend a distance downwards in the farm cage's depth direction, thereby forming a skirt round the farm cage.

The fluid-permeable net may be arranged closely around the farm cage, or at a distance from the farm cage.

The fluid-permeable net will then extend round the farm cage for fish, where the fluid-permeable net will extend from the farm cage's surface or edge down to a desired depth which is below the depth at which the undesirable organisms normally reside. The desired depth for the fluid-permeable net may vary based on geographical, biological and practical conditions, which means that the undesirable organisms, particularly salmon lice, have a certain maximum depth which must be covered by the net. This depth may typically be 5-15 meters. This design will offer great efficiency in the reduction of fouling and infestation of fish lice on farmed fish, without any reduction in the supply of oxygen, weight, health and welfare of the fish.

In brief outline the invention consists of a net of a fluid-permeable cloth which is mounted like a skirt round a farm cage in order to prevent salmon lice and other undesirable organisms from gaining access to the cage, while at the same time fresh and/or oxygen-rich water is permitted to flow in and out of the fluid-permeable net and the farm cage.

According to the present invention the fluid-permeable net may be manufactured or mounted in such a manner that it also covers the farm cage for a certain height over the surface of the water, in order thereby to prevent the undesirable organisms from being washed over the edge of the farm cage when there is a heavy sea/waves. The fluid-permeable net may then be manufactured in order to cover the whole of this area, or two fluid-permeable nets may be employed for this purpose, where one fluid-permeable net will extend so as to form the skirt round the farm cage, while the second fluid-permeable net may be connected to a railing or the like on the farm cage, in which case this fluid-permeable net will extend down to the surface of the sea. The two fluid-permeable nets can then be interconnected by suitable means.

In an embodiment the fluid-permeable net is represented as a rectangle, with a length which exceeds the circumference of the farm cage, with the result that the ends of the fluid-permeable net will overlap each other when the fluid-permeable net is mounted round the farm cage. In this case the overlapping ends may be connected, for example, by a zip fastener, buttons, sewing or the like, in order thereby to provide a "tight" overlap.

It should be understood, however, that the fluid-permeable net may also have other shapes, where this is adapted to suit the farm cage which has to be enclosed.

The farm cages used in salmon farming are normally circular, but it should be understood that the device for isolating farm cages for fish against undesirable organisms according to the present invention may also be employed on farm cages of a different construction, such as rectangular.

The fluid-permeable net comprises a net part which is made of a material with a typical mesh width from 100 μm to 1000 μm, a lower edge where a number of sinkers or weights are mounted in order thereby to provide tension in the fluid-permeable net, an upper edge which is provided with a number of flotation elements over the whole or parts of the length of the fluid-permeable net, in order thereby to give the fluid-permeable net a positive total buoyancy, together with lateral edges for attachment and reinforcement. All the sides of the fluid-permeable net and at regular intervals across the fluid-permeable net may be reinforced by straps, bands or the like in order to provide the fluid-permeable net with sufficient strength during mounting and use. The mesh of the fluid-permeable net is smaller than the organisms it has to exclude from the farm cage. The mesh width will typically be 350 μm, where it is assumed that this mesh will stop free-living stages of salmon lice.

An extra "skirt" may also be employed, normally in the railing on the farm cage which goes all the way down to the surface of the water in order to prevent transport of water and organisms into the farm cage due to the motion of the waves. This may be an integrated part of the main net or it may be mounted separately.

The salmon louse is positively phototaxic, which means that it seeks light. In daylight, therefore, it makes for the surface and when it is dark it may slip further down into the water. Thus the effect of the fluid-permeable net at a depth of 10 m may vary between day and night and between the light and dark seasons in the north. In theory, the use of light in the surface round farm cages can improve the effect of the fluid-permeable protective nets and/or it makes it possible to manage with a fluid-permeable net which is not so deep, thereby providing a positive effect with regard to water replacement/costs.

The fluid-permeable net may be mounted round the farm cage by mounting the fluid-permeable net in the water from the outside of the farm cage, in which case a vessel will be employed. The fluid-permeable net has positive buoyancy, thereby enabling it to be pulled round the farm cage and properly secured with an overlap both vertically and horizontally. The fluid-permeable net is normally 10% longer than the circumference of the farm cage it is enclosing. The fluid-permeable net is then secured round the farm cage's flotation ring with regular intervals between the fastening points. A surface part may then be attached up in the railing round the farm cage, thereby preventing undesirable organisms from being washed into the farm cage over the ring when there is a heavy sea or waves.

The fluid-permeable net according to the present invention can easily be replaced by placing a clean or new fluid-permeable net round the fluid-permeable net already mounted round the farm cage, which already mounted net is then released and pulled out from inside the new one. A continuous protection of the farm cage is thereby achieved, while at the same time the used fluid-permeable net can be easily removed for cleaning and maintenance. Reasons for replacing the net may be for washing/cleaning, maintenance, checking or alteration of mesh size, depth or set-up.

By means of nets made of a fluid-permeable material, infestation of biological organisms in farm cages can be greatly reduced, in addition to which these nets in general provide additional advantages when net bags are used. Positive results from the use of fluid-permeable protective nets include a lower population of salmon lice over time, less salmon louse infestation, less fouling on the net bags, removal of mussel and sea nettle infestation by simple means. Secondary effects are less lice damage to the fish, fewer delousing treatments, less wear on nets, less chance of escape and fish death in connection with washing and delousing. Handling of the fluid-permeable net, including replacement of nets for washing/maintenance is simple and not very labour intensive, especially compared with delousing and washing/replacement of net bags.

Thus by means of the present invention a device is provided for isolating a farm cage for fish comprising a fluid-permeable net, where the fluid-permeable net will lead to reduced frequency of treatment and development of resistance in salmon lice, in addition to substantial savings in resources and costs for the farming industry, increased fish welfare and an improved growth rate for the salmon. This, together with a reduction in the transfer of lice to wild fish, will also contribute to a positive development in the fish farming industry with regard to environmental sustainability. A lower level of louse infestation in a single fish farm will have positive consequences for other fish farms in the area (downstream) as the louse pressure will also be reduced here. With reduced louse pressure in many facilities in an area, over time it will be possible to reduce the total louse pressure in an area to a minimum.

Figure 2:
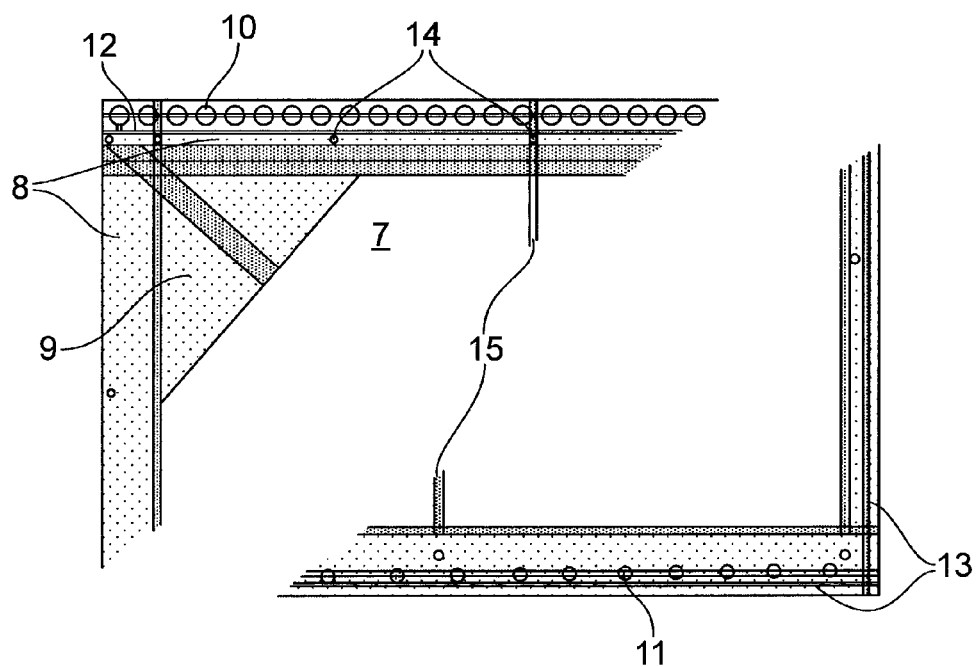
Figure 3:
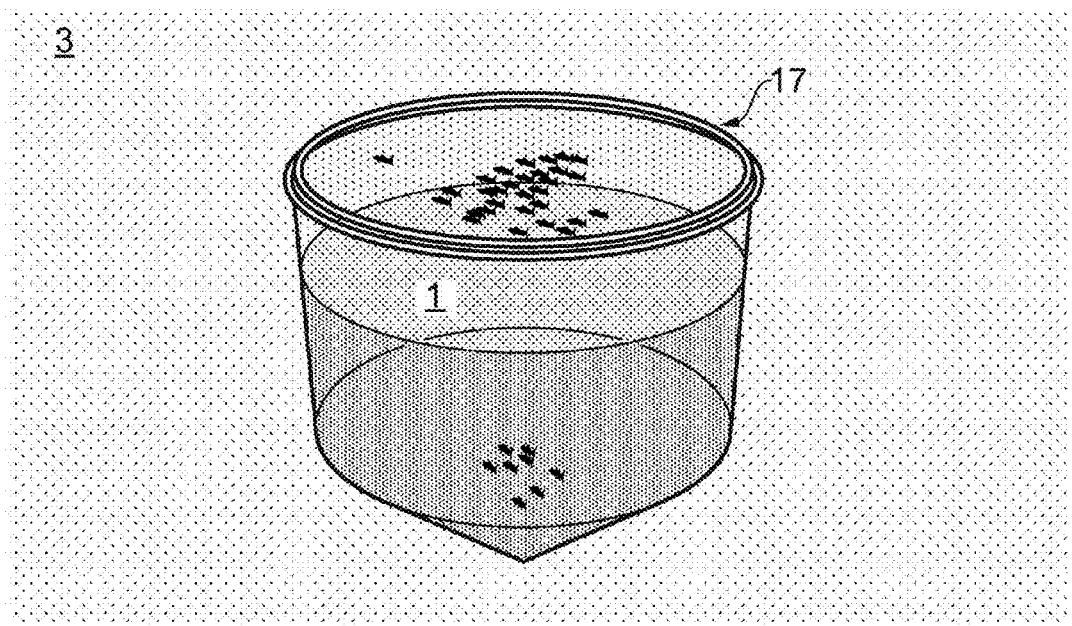
Figure 6:
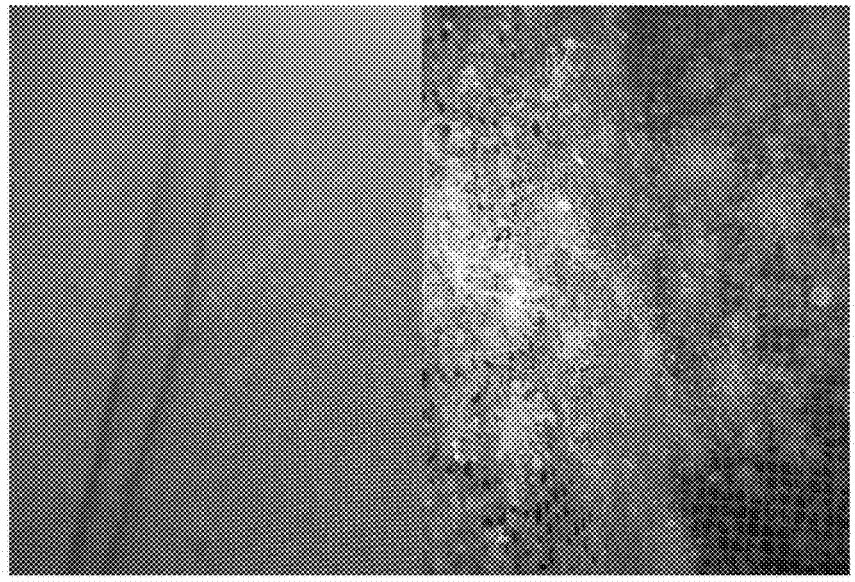
Figure 4:
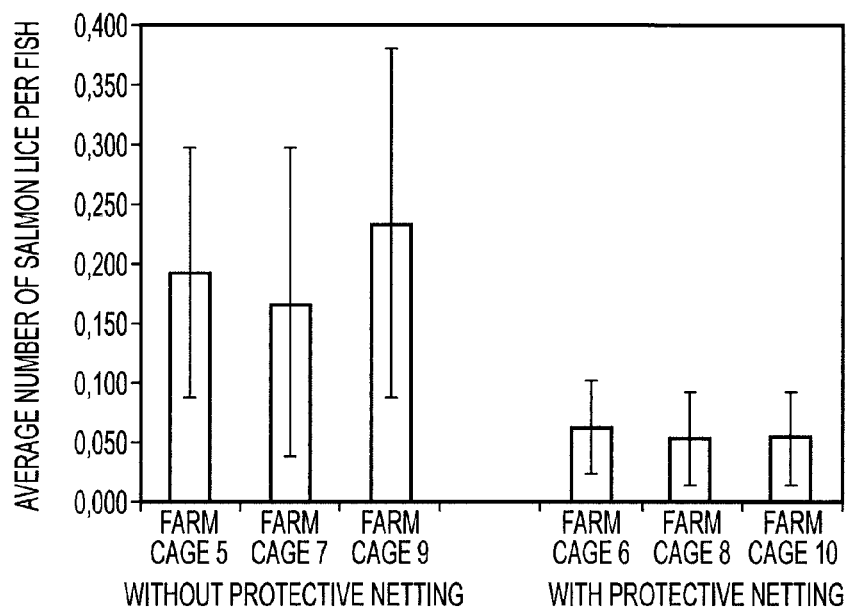
Figure 5:
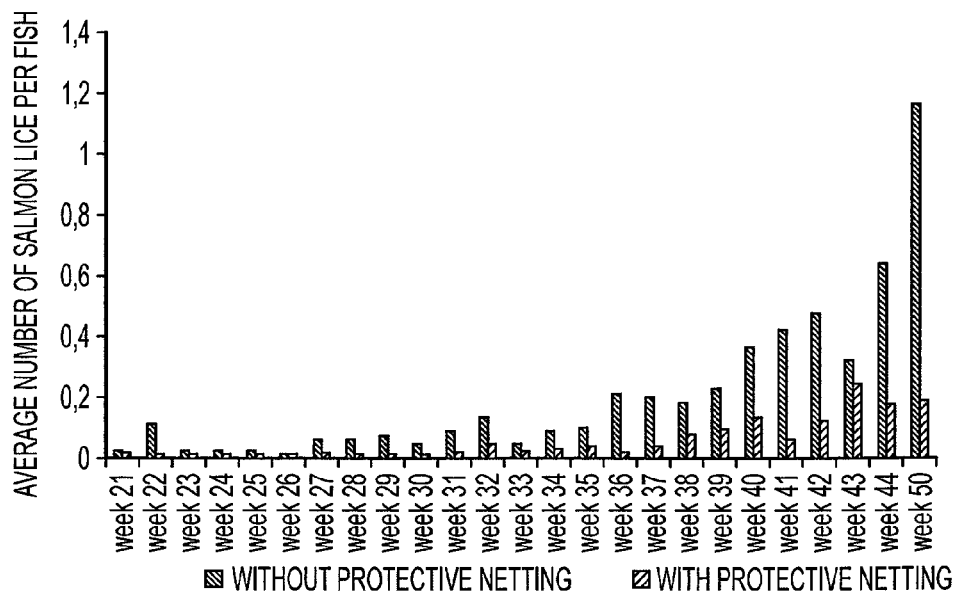

Other advantages and special features of the invention will become apparent from the following detailed description, the attached drawings and the following claims, in which FIG. 1 illustrates a device for isolating a farm cage against undesirable organisms according to the present invention, FIG. 2 illustrates details of the device according to FIG. 1, FIG. 3 illustrates the device according to FIG. 1 arranged enclosing a farm cage for fish, FIGS. 4 and 5 illustrate the average number of salmon lice per fish for farm cages with and without the device according to the present invention for a limited period of time, and FIG. 6 illustrates a net wall in a farm cage with and without the device according to the present invention.

FIG. 1 illustrates a device for isolating farm cages for fish against undesirable organisms according to the present invention, where the device is arranged enclosing the farm cage 17. The device comprises a fluid-permeable net 1, where the fluid-permeable net 1 has a length 5 and a depth 6, which length 5 is adapted in such a manner that the fluid-permeable net 1 will enclose the farm cage 17 with a certain overlap of the ends of the fluid-permeable net 1. The overlap of the fluid-permeable net 1 may typically be 10% of the circumference of the farm cage 17. A farm cage 17 with a circumference of 100 m will therefore require a fluid-permeable net 1 with a length of 110 m. The depth 6 of the fluid-permeable net 1 will have to be adapted on the basis of geographical and biological conditions and the characteristics of the undesirable organisms. The fluid-permeable net 1 will typically be provided with a depth 6 of 5-15 m, since in most cases this depth will prevent salmon lice from passing through the fluid-permeable net, in addition to which greater protection is obtained against fouling by mussels, hydroids and other organisms on the farm cage's net wall.

The fluid-permeable net 1 may be arranged closely around the farm cage 17, or at a distance from the farm cage 17.

The fluid-permeable net 1 according to the present invention is made of a suitable material, for example nylon, polyester or other materials, where the fluid-permeable net 1 is further provided with fine mesh widths, which mesh widths may typically be from 100 μm to 1000 μm.

FIG. 2 illustrates further details of the fluid-permeable net 1 according to FIG. 1, where it can be seen that the fluid-permeable net 1 is reinforced 8 along its lateral, top and bottom edges. This may be accomplished, for example, by using canvas, sailcloth, tarpaulin or the like. A person skilled in the art will know how this should be done, and it will therefore not be described further here.

Corners 9 in the fluid-permeable net 1 are extra reinforced by tarpaulin and ribbon fibre.

A number of flotation elements 10 are arranged in a suitable manner, for example by sewing them on, along the whole or parts of the length of the top edge of the fluid-permeable net 1. The flotation elements 10 will furthermore be arranged so that they give the fluid-permeable net 1 positive total buoyancy.

In the bottom edge of the fluid-permeable net 1 a number of sinkers or weights 11 are arranged in a suitable manner, for example by sewing them on, where these sinkers or weights 11 may be arranged over the whole or parts of the bottom edge.

In order to ensure that there is sufficient strength in the fluid-permeable net 1 during use and handling, rope or the like 12, 13 is arranged in the fluid-permeable net's 1 longitudinal and width direction, which rope 12, 13 extends substantially parallel to the fluid-permeable net's 1 top and bottom edge and lateral edges.

Round the whole or parts of the fluid-permeable net's 1 top, bottom and lateral edges a number of eyes (or loops) 14 are arranged, which eyes (or loops) 14 are used when fastening (mooring) the fluid-permeable net 1 to the farm cage and/or when handling the fluid-permeable net 1.

In order to further reinforce the fluid-permeable net 1, a number of reinforcements 15 in the form of ribbon fibre or the like are provided in the fluid-permeable net's 1 length and height, where these reinforcements 15 will extend substantially parallel to the fluid-permeable net's 1 lateral edges and top and bottom edges. These reinforcements 15 will also limit any damage or the like which may occur in the fluid-permeable net 1.

In FIG. 3 the fluid-permeable net 1 is depicted arranged enveloping a farm cage 17, where the fluid-permeable net 1 is towed round the farm cage 17 by means of a vessel (not shown), and thereafter connected in a suitable manner to an upper edge of the farm cage 17. The ends of the fluid-permeable net 1 are furthermore arranged overlapping one another, whereupon these too are connected in a suitable manner to the farm cage 17. The fluid-permeable net's 1 flotation elements 10 will then be substantially flush with buoyancy elements arranged round the circumference of the farm cage 17.

The fluid-permeable net 1 will then form a skirt round the farm cage 17, which skirt will then be open both upwardly and downwardly. The sinkers or weights 10 will then ensure that the fluid-permeable net 1 is kept taut, so that the fluid-permeable net 1 will substantially be located at the same depth the whole time.

FIGS. 4 and 5 illustrate how the average number of salmon lice per fish varies for farm cages with and without the device according to the present invention. In FIG. 4 the results are shown from a full-scale study which took place in a farm locality from May until December 2011, where six farm cages were employed. Round farm cages 5, 7 and 9 no fluid-permeable net 1 was provided, while a fluid-permeable net 1 was provided round farm cages 6, 8 and 10. Based on all the data from the study period (week 21-week 50) the farm cages 6, 8 and 10 showed that a substantially lower average number of salmon lice were found per fish in these farm cages than in the corresponding farm cages 5, 7 and 9 where no fluid-permeable net 1 was employed.

Results from the same study are shown in FIG. 5, but where the average number of salmon lice per fish for three test cages with protective net and three cages without protective net are shown per week.

FIG. 6 illustrates two net walls, each in its farm cage, where the left side of the figure shows how the net wall looks when the fluid-permeable net 1 according to the present invention is arranged round the farm cage, while the right side of the figure shows how fouling on the net wall is when no fluid-permeable net 1 is employed round the farm cage. The photographic material was obtained 22 weeks after the above tests were initiated. Both pictures were taken on the same day and at the same depth.

Example 1

A study was carried out where the fluid-permeable net 1 was tested on a commercial scale. Three farm cages were provided with a protective net, and three farm cages were selected as reference cages without the use of the fluid-permeable net. The fluid-permeable nets are identical to the types described and illustrated in FIGS. 1 and 2, where the fluid-permeable nets 1 were provided with a length 5 of 110 meters and depth 6 of 10 meters. The farm cages were arranged in a line in the water, and every other farm cage was provided with the fluid-permeable net. At the beginning of the test smolt were placed in all the farm cages simultaneously. These had not been exposed to untreated sea water, and were therefore free from salmon lice or other parasites. The test was carried out from May (week 21) until December (week 50) in 2011. Every week during the test period, except for weeks 45 to 49, the lice were counted on 30 fish from each farm cage. An oxygen meter was installed in each of the farm cages involved in the test in order to ensure that the fish had a sufficient supply of oxygen. Extra fluid-permeable nets were available at all times in case there was a need for replacement.

The results of the tests are as described and illustrated in FIGS. 4 and 5. There was little difference at the beginning of the test, but as the amount of salmon lice in the water increased over the period, the differences became greater. The statistical analyses of the data for the entire study period (FIG. 5), including the weeks when measurements were lacking, showed that the average number of salmon lice per fish increased significantly by the week ($p<0.001$) and was significantly higher in cages without protective netting ($p=0.018$). A generalised linear model (G L M, Nelder, J. and Wedderburn, R. (1972) *Journal of the Royal Statistical Society, Series A (General)*, Blackwell Publishing, 135 (3): 370-384) was employed for the analyses. Prior to the analyses the average number of salmon lice per fish was square root-transformed in order to improve the homogeneity in the variances. The best model (based on the lowest Akaike Information Criterion, AIC) modelled the density in the cages dependent on week, factor with/without net, cage and the correlation between week and factor with/without net.

This shows that the fluid-permeable nets have a clearly positive effect by preventing infestation of salmon lice on farmed salmon in the farm cages. The use of fluid-permeable netting reduced the average number of salmon lice per fish by a factor of 4 over the whole study period. At the end of the test in week 50 the average number of salmon lice per fish was reduced by a factor of around 6 by means of the use of the above-described fluid-permeable net (see FIG. 5).

At no time were critically low oxygen values registered in the farm cages, despite the fact that in one case the fluid-permeable nets were located outside for 2 months without maintenance and washing. These still had sufficient through-flow to make up for the oxygen consumption of the fish.

The fluid-permeable nets were replaced on 3 occasions, in two cases because the facility had an infestation of meroplankton, and in one case where the fluid-permeable net was damaged as a result of the use of boats near the facility. Replacement of the fluid-permeable nets was accomplished easily without damage to the nets and with a relatively little amount of work.

Example 2

A significant effect of the fluid-permeable nets was registered with regard to infestation of meroplankton during the test period (see FIG. 6). The facility was infested by colony-forming hydroids (*Ectopleura* spp.) and mussel larvae (*Mytilus* spp.) in the course of the test. A few days after the infestation the fluid-permeable nets were replaced. At the end of the test in week 50 there was no fouling on the net wall in the uppermost 10 meters of the farm cages which had fluid-permeable netting. However, such large amounts of hydroids and mussels were detected on the reference cages that they had to be replaced and washed (see FIG. 6). The photographic material in FIG. 6 was obtained by diving and underwater photography as a part of a routine monitoring of the facility.

The pictures were taken in week 43, 22 weeks after the start of the test. At the end of the test control weighing of the fish was carried out, and no differences were detected in the weight of the fish in the test cages and the reference cages.

Examples 1 and 2 form the basis for development of a protective net which can be used in commercial fish farming to restrict infestation of sea lice on fish and fouling by meroplankton on the net line. The invention reduces the need for cleaning/maintenance on the cages, thereby increasing the life of net bags on the cages. The invention simplifies and reduces the risk during maintenance. The invention is not dependent on other devices, such as circulation pumps and mechanical/electrical control mechanisms, but will be able to be used in connection therewith. The invention will not influence the living conditions of the fish in a negative direction to an extent which will require measures to be taken. In the long term the invention can halt the epidemic development of salmon lice in habitats engaged in salmon farming.

The invention has now been explained by means of several non-limiting embodiments. A person skilled in the art will appreciate that a number of variations and modifications may be carried out of the device for isolating farm cages for fish against undesirable organisms as described within the scope of the invention as it is defined in the attached claims.

The invention claimed is:

1. A device for isolating farm cages for fish against undesirable organisms, which device is arranged enclosing a farm cage, characterised in that the device comprises a fluid-permeable net having a mesh width from 100 μm to 1000 μm which permits a secure supply of oxygen to the farm cage, which fluid-permeable net is open upwardly and downwardly, and extends a distance down in the farm cage's depth direction, forming a skirt round the farm cage.

2. A device according to claim 1, characterised in that a number of flotation elements are arranged along the whole or parts of the upper edge of the fluid-permeable net.

3. A device according to claim 1, characterised in that the fluid-permeable net is reinforced along its sides, bottom, and top by a cloth or tarpaulin material.

4. A device according to claim 1, characterised in that sinkers are arranged along the whole or parts of the lower edge of the fluid-permeable net.

5. A device according to claim 1, characterised in that rope is arranged along the whole or parts of the upper and lower edge of the fluid-permeable net.

6. A device according to claim 1, characterised in that eyes are provided along the bottom, top, and lateral edges of the fluid-permeable net.

7. A device according to claim 1, characterised in that a number of reinforcements in the form of straps or ribbon fibre are arranged along the whole or parts of the fluid-permeable net's length, which reinforcements extend between the fluid-permeable net's upper and lower edges.

8. A device according to claim 1, characterised in that a number of light sources are arranged along the fluid permeable net's length, or at the surface at a reasonable distance from the farm cage.

* * * * *